US011359496B2

(12) United States Patent
Harding

(10) Patent No.: US 11,359,496 B2
(45) Date of Patent: Jun. 14, 2022

(54) COOLANT CHANNEL

(71) Applicant: ROLLS-ROYCE plc, London (GB)

(72) Inventor: Adrian L. Harding, Derby (GB)

(73) Assignee: ROLLS-ROYCE PLC, London (GB)

( * ) Notice: Subject to any disclaimer, the term of this patent is extended or adjusted under 35 U.S.C. 154(b) by 117 days.

(21) Appl. No.: 16/797,011

(22) Filed: Feb. 21, 2020

(65) Prior Publication Data

US 2020/0284153 A1    Sep. 10, 2020

(30) Foreign Application Priority Data

Mar. 6, 2019  (GB) ..................................... 1902997

(51) Int. Cl.
*F01D 5/18* (2006.01)
*B22C 9/10* (2006.01)
*F01D 9/06* (2006.01)

(52) U.S. Cl.
CPC ................ *F01D 5/187* (2013.01); *B22C 9/10* (2013.01); *F01D 9/065* (2013.01); *F05B 2230/211* (2013.01); *F05B 2240/301* (2013.01); *F05B 2260/201* (2013.01); *F05B 2260/2241* (2013.01); *F05D 2230/211* (2013.01); *F05D 2240/126* (2013.01); *F05D 2260/204* (2013.01); *F05D 2260/22141* (2013.01); *F05D 2260/40311* (2013.01)

(58) Field of Classification Search
CPC .......... F01D 5/186; F01D 5/187; F01D 5/188; F01D 5/189; F01D 9/065; F05D 2240/126; F05D 2230/211; F05D 2260/20; F05D 2260/202; F05D 2260/204; F05D 2260/22141; F05D 2260/201; F05D 2240/127; F05D 2260/2212; F05D 2260/40311
See application file for complete search history.

(56) References Cited

U.S. PATENT DOCUMENTS

| | | | |
|---|---|---|---|
| 4,073,599 | A | 2/1978 | Allen et al. |
| 5,669,759 | A | 9/1997 | Beabout |
| 5,772,397 | A | 6/1998 | Morris et al. |
| 6,179,565 | B1 | 1/2001 | Palumbo et al. |
| 7,364,405 | B2 | 4/2008 | Cunha et al. |
| 8,047,790 | B1 | 11/2011 | Liang |
| 8,864,469 | B1 | 10/2014 | Liang |

(Continued)

FOREIGN PATENT DOCUMENTS

| | | |
|---|---|---|
| EP | 1674661 | 6/2006 |
| EP | 2 468 433 A2 | 6/2012 |

(Continued)

OTHER PUBLICATIONS

Office action of U.S. Appl. No. 16/355,920, dated May 14, 2020, pp. 1-7, USPTO, Alexandria, VA.

(Continued)

*Primary Examiner* — Christopher Verdier
(74) *Attorney, Agent, or Firm* — Crowell & Moring LLP

(57) ABSTRACT

A component for a gas turbine engine, comprising: first and second walls; a coolant channel defined by the space between the first and second walls; and a first rib extending between the first and second walls to the end of the coolant channel in a coolant flow direction, such that the coolant channel is bifurcated in the coolant flow direction.

10 Claims, 5 Drawing Sheets

(56) References Cited

U.S. PATENT DOCUMENTS

| | | |
|---|---|---|
| 2006/0133935 A1 | 6/2006 | Papple |
| 2006/0153679 A1 | 7/2006 | Liang |
| 2006/0269408 A1 | 11/2006 | Liang |
| 2007/0014664 A1 | 1/2007 | Dellmann et al. |
| 2007/0183893 A1 | 8/2007 | Horiuchi et al. |
| 2008/0019840 A1 | 1/2008 | Cunha |
| 2009/0123292 A1 | 5/2009 | Gu et al. |
| 2010/0014102 A1 | 1/2010 | Blair |
| 2010/0054952 A1 | 3/2010 | Gross |
| 2013/0064639 A1* | 3/2013 | Morris .................... F01D 5/187 415/1 |
| 2013/0243575 A1 | 9/2013 | Zelesky et al. |
| 2014/0147287 A1 | 5/2014 | Xu |
| 2017/0030199 A1* | 2/2017 | Barker .................... F01D 5/187 |
| 2017/0030202 A1 | 2/2017 | Itzel et al. |

FOREIGN PATENT DOCUMENTS

| | | |
|---|---|---|
| EP | 3321474 | 5/2018 |
| WO | 2016160029 | 10/2016 |

OTHER PUBLICATIONS

Great Britain Examination Report of Application GB1805853.7, dated Nov. 4, 2020, pp. 1-2, Intellectual Property Office, Newport, South Wales, GB.

Great Britain search report dated Oct. 2, 2018, issued in Great Britain patent application GB1805853.7.

Great Britain search report dated Aug. 30, 2019 issued in GB Patent Application No. 1902997.4.

Extended European Search Report, dated Jul. 27, 2020, pp. 1-7, issued in European Patent Application No. 20157726.9, European Patent Office, Munich, Germany.

* cited by examiner

COOLANT CHANNEL

CROSS-REFERENCE TO RELATED APPLICATIONS

This specification is based upon and claims the benefit of priority from UK Patent Application Number GB 1902997.4 filed on 6 Mar. 2019, the entire contents of which are incorporated herein by reference.

BACKGROUND

Technical Field

The present disclosure relates to the provision of components within a gas turbine engine having an internally formed coolant channel. For example, it has been known to provide coolant channels between an inner wall and an outer wall on a suction side of an aerofoil blade or vane that is part of a turbine within such a gas turbine engine.

Description of the Related Art

In order to make such components, it has been known to use an investment casting process using a ceramic core to form the internal cooling channel. In such an arrangement, a ceramic core is formed that has the shape of the desired internal cooling passages. The component is then formed around the ceramic core, which is subsequently removed, e.g. leached with alkaline solution to leave the hollow metal component.

It has also been known to provide ribs between the inner and outer walls. These ribs may attach the inner and outer walls together, improving the structural strength, and may be used to direct the flow of coolant through the coolant channel that is defined by the inner and outer wall. However, the ribs in the final component are holes within the ceramic core used to form the final component. These holes may reduce the strength of the ceramic core, leading to breakage during the casting process.

It may therefore be desirable to provide an improvement to this system.

SUMMARY

According to a first aspect there is provided a component for a gas turbine engine, comprising: first and second walls; a coolant channel defined by the space between the first and second walls; and a first rib extending between the first and second walls to the end of the coolant channel in a coolant flow direction, such that the coolant channel is bifurcated in the coolant flow direction.

During operation of a gas turbine engine, a temperature gradient is formed across a rib that extends between a first and second wall of a coolant channel, such as an inner and outer wall of an aerofoil component. Such a temperature gradient may create thermal stresses across the rib, which can lead to fracturing of the rib and in turn a reduction of the integrity and workable lifetime, e.g. low cycle fatigue life, of the component. While the entire rib may be thermally stressed, the distal ends of the ribs (in the upstream and downstream directions) are subjected to particularly high stresses.

The present disclosure is concerned with providing a first rib that extends to the (e.g. distal) end of the channel in the downstream direction, e.g. extends to and is integrally formed with an end wall of the channel corresponding to, e.g., a leading edge of the aerofoil component. The provision of such a rib may increase the strength of the component at the downstream end of the rib. In particular, the rib may allow the forces to be more evenly distributed at the end of the channel, thereby minimising the formation of any local high-stress regions and increasing the strength and workable lifetime of the final component. This is particularly the case as compared to hypothetical arrangements in which the rib does not extend to the very end of the coolant channel and results in the formation of a highly stressed region at the downstream end, which can compromise the integrity of the component.

The coolant channel may be bifurcated into two sections that are separated in a radial direction of the component by the first rib.

The first rib may be itself bifurcated into two radially separated sections that both extend to the end of the coolant channel (e.g. are integrally formed with an end wall of the channel) in the coolant flow direction. In this way, the stress in each section may be reduced as compared to arrangements where the rib is not bifurcated.

The first rib may be radially central to the component.

The first rib may have a total longitudinal extent that is at least half of a maximum longitudinal extent of the coolant channel.

The component may further comprise a pair of second ribs extending between the first and second walls, wherein a first one of the pair of second ribs may be located at a position that is radially outwards of the first rib and a second one of the pair of second ribs may be located at a position that is radially inwards of the first rib.

The pair of second ribs may extend towards, but not entirely to, the end of the coolant channel in the coolant flow direction.

A radial extent of the coolant channel may increase in the coolant flow direction.

The component may be an aerofoil blade or vane comprising an aerofoil leading edge, an aerofoil trailing edge and an aerofoil suction side opposite an aerofoil pressure side. The first and second walls may be provided on the aerofoil suction side and may define a coolant channel to cool the aerofoil suction side of the component.

The coolant channel may be a forward-flowing passage in that the coolant flow direction may be from the aerofoil trailing edge to the aerofoil leading edge.

According to a further aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft; and at least one component substantially as described herein and in the preceding statements.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to a further aspect, there is provided a ceramic core for use in investment casting of a component according to any one of the preceding statements. The ceramic core may comprise a section that is configured to define the shape of the coolant channel within the component, during formation of the component, and then be removed to leave a space that is the shape of the coolant channel.

The ceramic core section may be configured to define the shape of the coolant channel within the component in that it comprises: a first hole that extends between an outer surface and an inner cavity of the core. The first hole may extend to an end of the core section in a longitudinal direction corresponding to the coolant flow direction of the component, such that the core section is bifurcated in the longitudinal direction.

The core section may be bifurcated into two sections that are separated in a radial direction of the core.

The first hole may be radially central to the core.

The first hole may have a total longitudinal extent that is at least half of a maximum longitudinal extent of the core section.

The ceramic core may further comprise a pair of second holes extending between the outer surface and an inner cavity of the core. A first one of the pair of second holes may be located at a position that is radially outwards of the first hole and the other one of the pair of second holes may be located at a position that is radially inwards of the first hole.

According to a further aspect, there is provided a method of manufacturing a component according to any one of the preceding statements. The method may comprise the step of investment casting the component using a ceramic core according to any one of the preceding statements.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The compressor or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The turbine or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, with reference to the Figures, in which.

Figure 4:
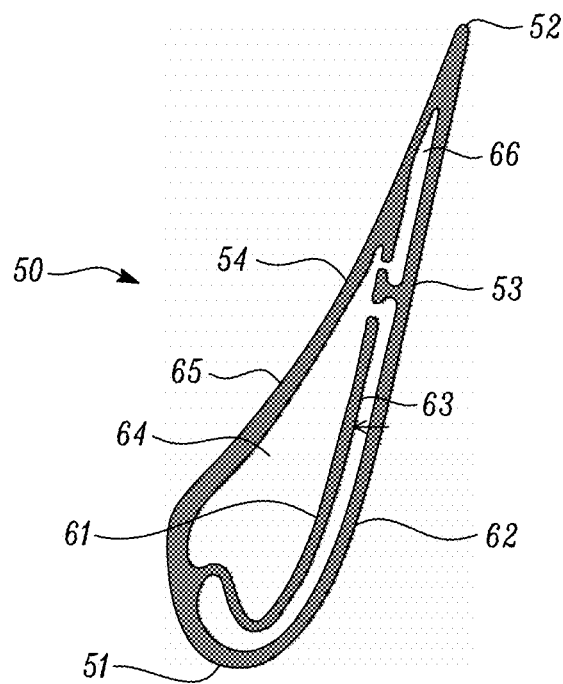
Figure 5:
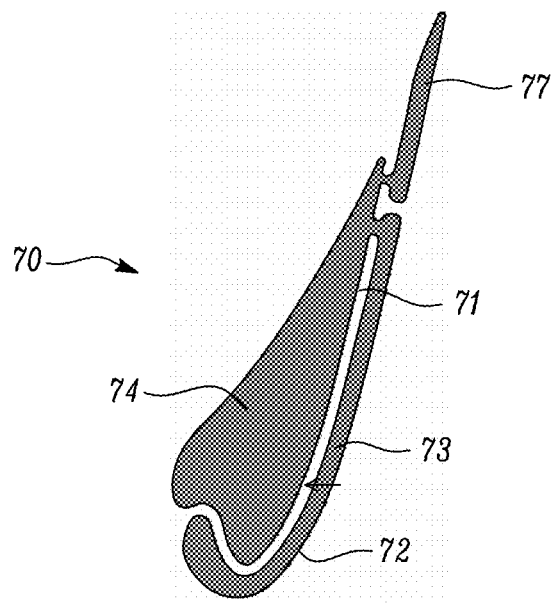
Figure 6:
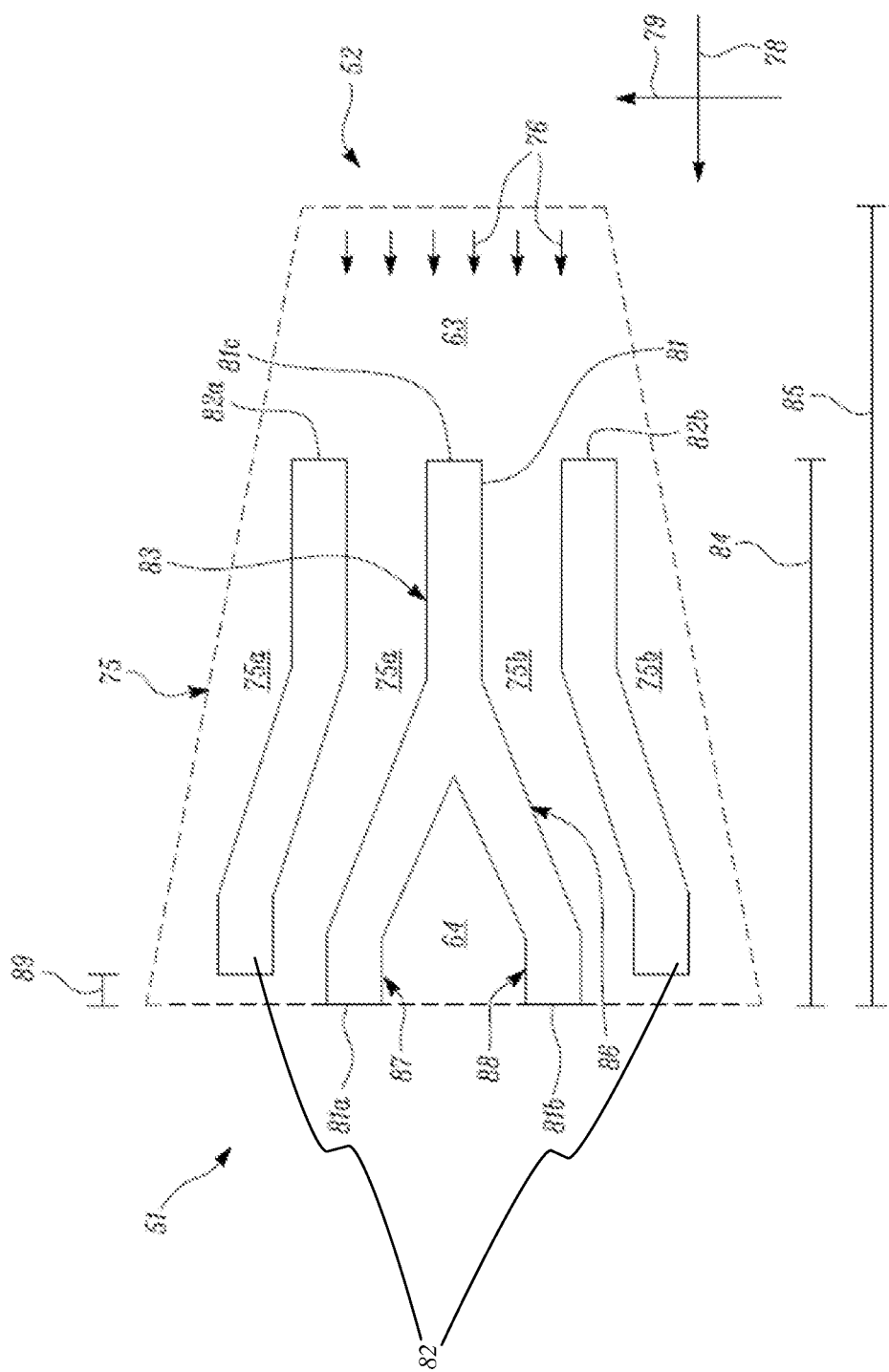
Figure 7:
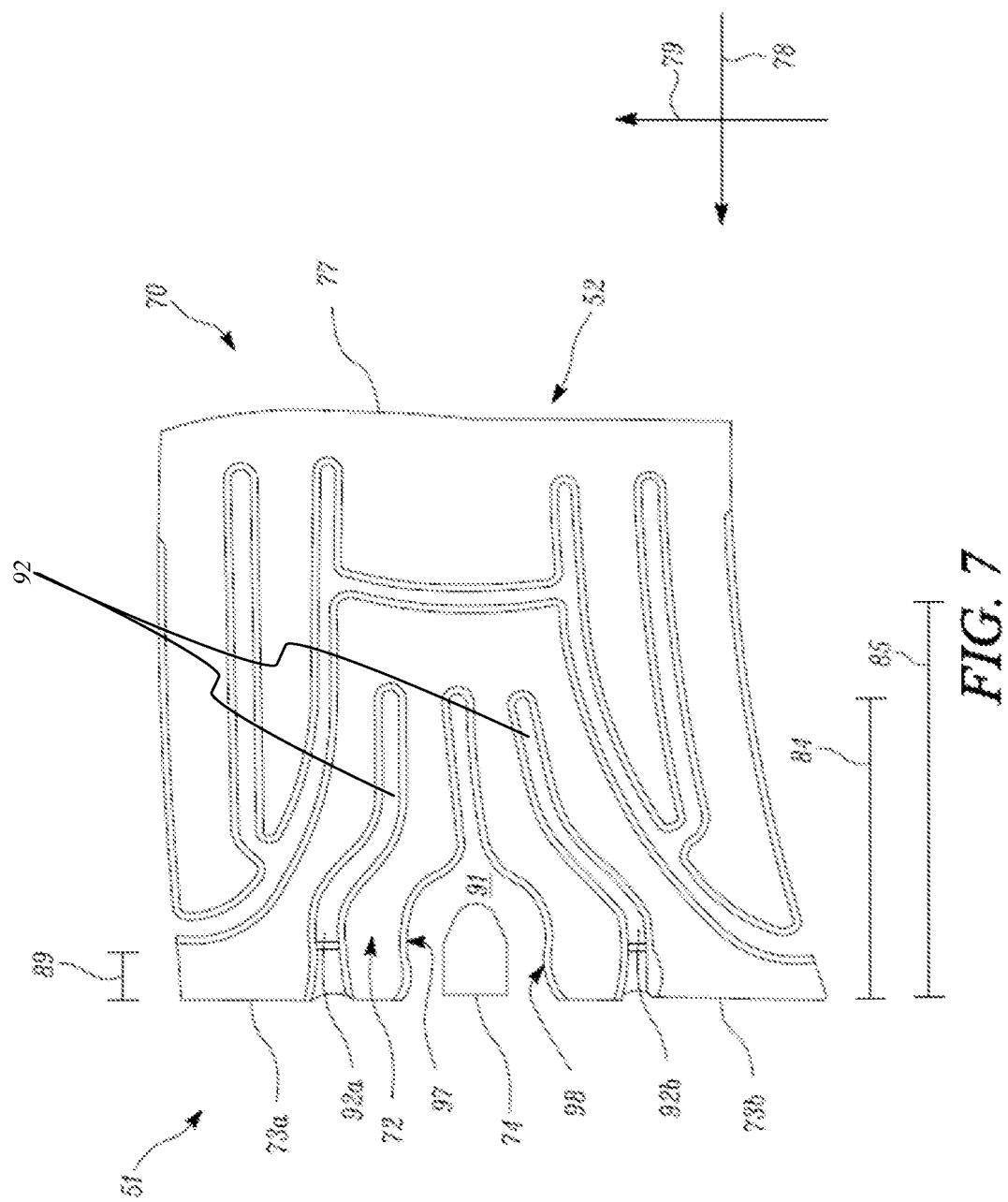

FIG. 4 schematically depicts, in cross-section, a component to which the present disclosure may apply;

FIG. 5 schematically depicts, in cross-section, a ceramic core for use in the manufacture of the component depicted in FIG. 4; and FIGS. 6 and 7 schematically depict a component and corresponding ceramic core, in accordance with the present disclosure.

DETAILED DESCRIPTION

Figure 1:
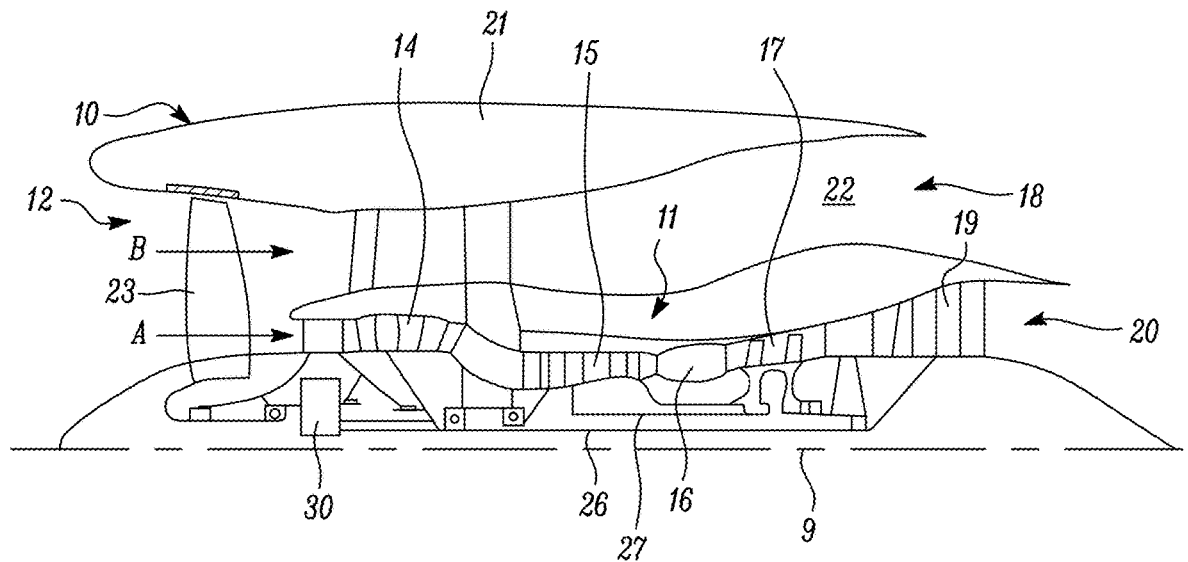
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
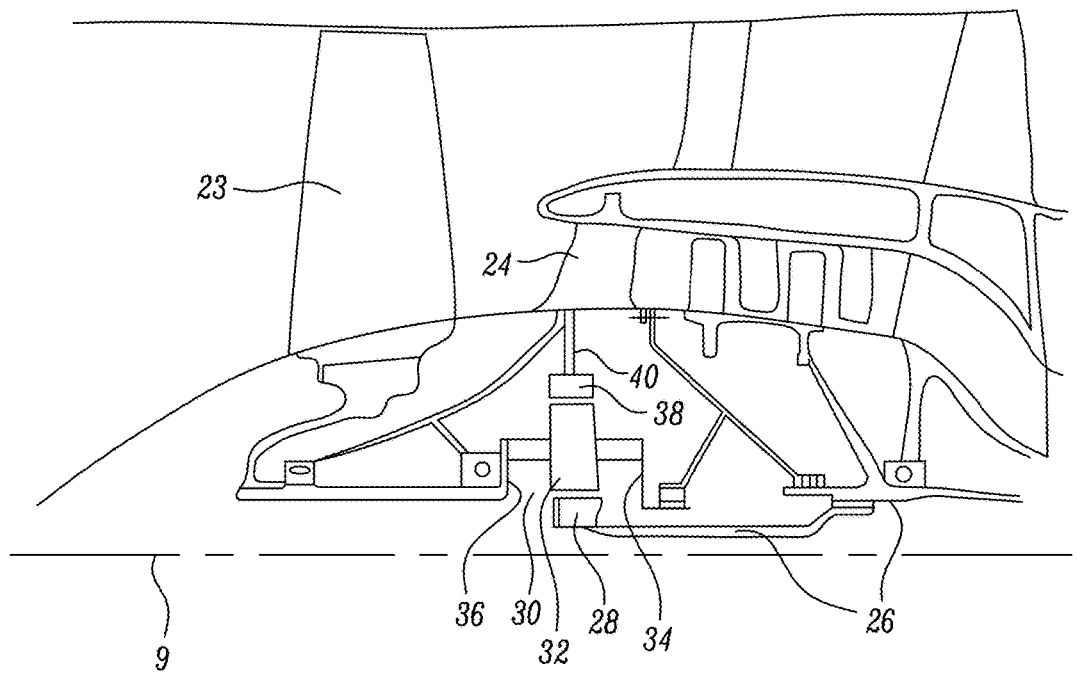
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
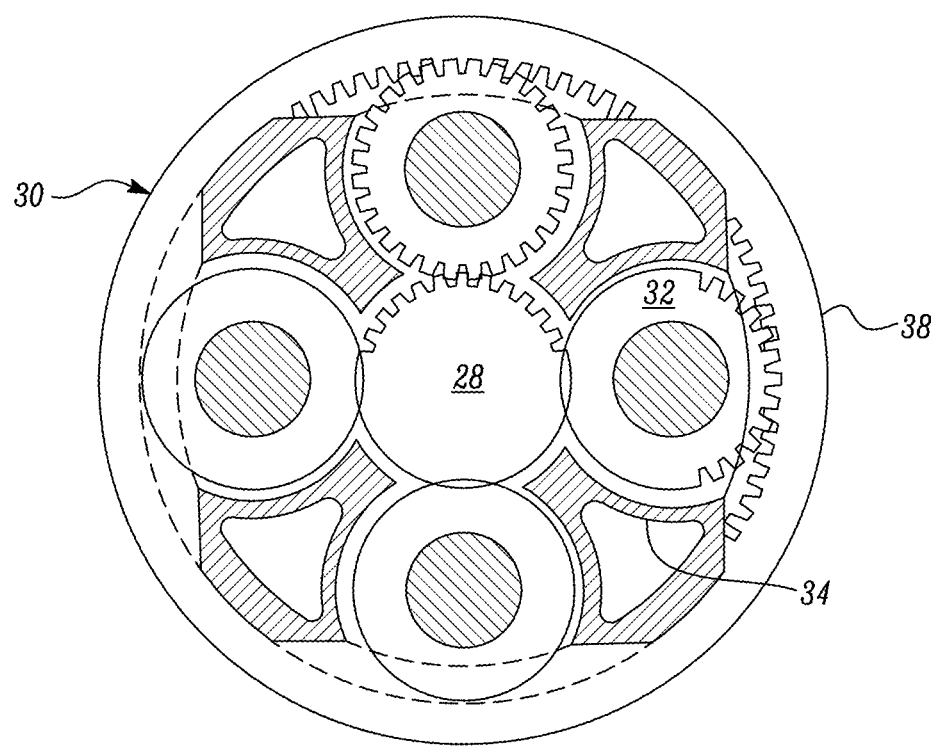
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4 schematically depicts, in transverse cross-section, a component to which the present disclosure may apply, in particular an aerofoil blade that may be incorporated within a turbine. Such an aerofoil component 50 has a leading edge 51, trailing edge 52, suction side 53 and pressure side 54 as generally indicated in FIG. 4.

As shown, the suction side 53 of the aerofoil 50 may be formed from an inner wall 61 and an outer wall 62 with a space 63 provided between the inner wall 61 and outer wall 62. The pressure side 54 may be formed from a pressure side wall 65 that together with the inner wall 61 defines a central cavity 64 of the aerofoil 50. Towards the trailing edge 52 of the component 50 on the suction side 53 is a further cavity or space 66 which is provided between the pressure side wall 65 and the outer wall 62 on the suction side 53 of the component 50. The central cavity 64 generally extends along the radial extent of the aerofoil 50 and receives coolant air for onward distribution to the space 63 between the inner wall 61 and outer wall 62 and the space 66 between the pressure side wall 65 and the outer wall 62.

The space 63 between the inner wall 61 and the outer wall 62 may be configured to receive a flow of coolant fluid, e.g. gas, in order to cool the suction side 53 of the aerofoil 50. In the example of FIG. 4, the space 63 defines a so-called forward-flowing passage in which the coolant flows in generally a forward direction from the trailing edge 52 towards the leading edge 51 of the component 50. One or more apertures, not shown in FIG. 4, may connect the space 63 to the exterior surface of the aerofoil 50. In such an arrangement, coolant may be provided to the root of the aerofoil, flow through a supply channel in the aerofoil to the coolant channel, flow through the coolant channel provided by the space 63 and out through the apertures. In some cases, the apertures may be configured such that coolant flows over the surface of the aerofoil 50. For example, the outer wall 62 may be provided with apertures extending therethrough at or proximate the leading edge 51 of the aerofoil 50 such that coolant ejected through the apertures forms a layer or "film" of coolant gas along the suction surface 62 of the aerofoil 50.

The space 66 between the pressure side wall 65 and the outer wall 62 may also be configured to receive a flow of coolant fluid in order to cool the suction side 53 of the aerofoil 50. In contrast to space 63, however, the space 66 defines a so-called rearward-flowing passage in which the coolant flows in generally a rearward direction from the leading edge 51 towards a trailing edge 52 of the aerofoil component 50.

In order to form the aerofoil 50, including the space 63 defining the coolant channel, an investment casting process may be used. In such a process, a ceramic core is formed having the shape of the internal cavities desired within the aerofoil component 50, including the space 63 defining the forward-flowing passage, the space 66 defining the rearward-flowing passage and the central cavity 64. The component, such as aerofoil 50, is subsequently formed around the core, for example, by casting. Finally, the core is removed, for example leached with alkaline solution to leave the component with cavities of the desired shapes.

FIG. 5 schematically depicts, in cross-section, a ceramic core 70 for use in the manufacture of the aerofoil component depicted in FIG. 4. As shown, the ceramic core 70 includes a cavity 71 that corresponds to the desired shape of the internal wall 61 of the aerofoil component 50. The outer surface 72 of the ceramic core defines the inner surface of the outer wall 62 and the inner surface of the pressure side wall 65 of the aerofoil component 50. A section 73 of the core 70 corresponds to the shape of the space 63 between the inner wall 61 and the outer wall 62 and section 74 of the core corresponds to the shape of the central cavity 64 of the aerofoil component 50.

Within the aerofoil component 50, elongate ribs may be provided between the inner wall 61 and the outer wall 62. The ribs may mechanically attach the inner wall 61 and outer wall 62 together, improving the structural strength of the aerofoil component 50. Alternatively or additionally, the ribs may function to subdivide the space 63 between the inner wall 61 and the outer wall 62, namely the coolant channel, and/or guide the direction of the flow of coolant within the coolant channel.

However, the provision of ribs traversing the space 63 between the inner wall 61 and the outer wall 62 of the aerofoil component 50 corresponds to the provision of voids or holes within the section 73 of the core 70 that defines the space 63 in the finished component. These holes may weaken the core 70. This may result in breakage of parts of the core 70 during the formation of the aerofoil component 50 around the core 70 and/or relative movement of one part of the core 70 relative to another part of the core 70 during formation of the aerofoil component 50 around the core 70, resulting in erroneous formation of the aerofoil component 50.

The selection of the size of the ribs may therefore be a compromise between a benefit of increasing the size of the ribs for the structural strength of the aerofoil component 50 and/or controlling the direction of coolant flow within the space 63 between the inner wall 61 and the outer wall 62 and a disadvantage of correspondingly reducing the strength of the ceramic core 70 by increasing the size of the holes within it.

An additional factor that may affect the selection of the size of the ribs results from the process of forming the ceramic core. The ceramic core may be manufactured using a ceramic injection moulding process (CIM). A ceramic material, for example silica, is suspended in an organic, polymeric binder to create a feedstock. This feedstock is then injected into a die cavity of the required side and shape to create a "green" component, comprised of the ceramic and binder component. The binder is subsequently thermally or chemically removed and the ceramic consolidated by sintering/firing at elevated temperatures; this gives the final ceramic core.

The core is usually supported during the firing process by placing it within a ceramic receptacle and surrounding it with an inert firing power. This may have the advantage of promoting controlled binder removal by wicking during the early stages of firing. However, in the case of a ceramic core such as that depicted in FIG. 5, it can be difficult to remove the firing media from the cavity 71 that corresponds to the inner wall 61 to be formed within the aerofoil component 50. It may also be difficult to inspect the cavity 71 in order to ensure that correct formation of the core 70 has taken place and that the firing media has been removed. As discussed above, the ribs to be formed between the inner wall 61 and the outer wall 62 of the aerofoil component 50 correspond to holes within the section 73 of the ceramic core 70 that corresponds to the space 63 to be provided between the inner wall 61 and outer wall 62 of the aerofoil component 50. These holes may provide access to the cavity 71 for firing media removal and/or inspection.

The present disclosure provides arrangements of ribs for use in components such as an aerofoil 50 that may enable improvements in the product incorporating the ribs and/or the manufacturing process. It should be appreciated that, although this disclosure is provided in the context of the formation of an aerofoil blade or vane, in general the arrangement is applicable to other components within a gas turbine engine in which a coolant channel is provided between first and second walls and having ribs extending between the first and second walls. Such other components may include the combustion liner, turbine rotor liner, or afterburner systems.

FIGS. 6 and 7 schematically depict a possible arrangement of ribs within a coolant channel and a corresponding ceramic core that may be used to form the same, respectively.

With particular reference to FIG. 6, there is shown a possible arrangement of ribs 81, 82 within a forward-flowing coolant channel 75 of a so-called reverse-pass cooling system, as viewed from a suction side 53 of the aerofoil component 50. As mentioned previously, the coolant channel 75 is said to be forward-flowing in that the coolant within the channel 75 generally flows in a coolant flow direction 76 from a point towards the trailing edge 52 towards the leading edge 51 of the aerofoil 50. The coolant channel 75 has a longitudinal extent along a longitudinal direction 78 and a radial extent along a radial direction 79 that is perpendicular to the longitudinal direction 78. Although not shown, the coolant channel also extends in a transverse direction perpendicular to the longitudinal and radial directions 78, 79.

In the example depicted in FIG. 6, the coolant channel 75 radially diverges in the longitudinal direction 78 as defined by the direction of flow of coolant 76. In other arrangements, however, the coolant channel 75 may have a substantially constant radial extent, or may converge in the longitudinal direction 78. It will also be appreciated that in reality the ribs may have rounded corners in order to reduce stress concentrations.

As shown in FIG. 6, the ribs 81, 82 may generally be elongate in nature. The ribs may be provided within a space 63 and may extend the entire transverse length between the first and second walls 61, 62 in order to subdivide the coolant channel 75 that is defined by the first and second walls 61, 62. The first wall 61 may be an inner wall of the component 50 and the second wall 62 may be an outer wall of the component 50. In particular, the coolant channel 75 and ribs 81, 82 may be configured such that coolant flows within spaces adjacent to ribs 81, 82 and is aligned with the elongate length of the ribs 81, 82. In local regions, the direction of the flow of coolant 76 within the spaces may be parallel to the elongate length of the ribs 81, 82.

The configuration or ribs includes a first rib 81 that is elongate in the longitudinal direction 78 and extends to the distal end of the channel 75 in the downstream direction of the flow of coolant 76. The first rib 81 subdivides and bifurcates the channel 75 into two entirely radially separated sections, a first section 75a and a second section 75b, each of which may have substantially the same volume. The end of the channel 75 is located at or near the aerofoil leading edge 52, which is particularly susceptible to stress failure. For example, at the end of the channel 75 may be the inner surface of the leading edge 51 or crown of the aerofoil component 50. Such arrangements may increase the strength of the leading edge 52 thereby enabling a significant stress reduction for the forward-flowing channel 75. Increasing the strength of the component may in turn increase the workable lifetime of the final component.

The first rib 81 is radially central to the aerofoil 50 and has a total longitudinal extent 84, i.e. a maximum length in a direction parallel to the longitudinal direction 78, that is at least half, preferably 75%, of the total longitudinal extent 85 of the coolant channel 75, such that the coolant channel 75 is bifurcated along at least half of the longitudinal extent 85 of the coolant channel. This may allow the strength of the aerofoil 50 to be increased.

An upstream end of the first rib 81 is at a position that may be longitudinally separated from the upstream end of the channel 75 by at least 5 mm, or at least 10 mm, e.g. 12 mm. This may provide sufficient space to allow for a plenum of cooling fluid (e.g. air) to form at the upstream end of the channel 75, such that the cooling fluid is evenly distributed between the first and second sections 75a, 75b of the channel 75, thereby increasing cooling efficiency.

As can be seen in FIG. 6, the first rib 81 is itself configured to have a shape that is bifurcated or "forked". The first rib 81 may include, at a first longitudinal end, a two-pronged shape. In particular, the first rib 81 comprises a first branch 81a and a second branch 81b at the end of the channel 75 in the downstream direction, which are radially separated at that position. The first branch 81a and the second branch 81b extend in an upstream direction and merge or combine to define a single rib section 81c at a second longitudinal end opposite the first longitudinal end of the first rib 81, where the second longitudinal end is upstream of the first longitudinal end in the coolant flow direction 76.

It will be appreciated that the radially outer side of the first rib 81, e.g. first branch 81a, may define a radially inner wall 83 of the first bifurcated section 75a of the coolant channel 75. A radially inner side of the first rib 81, e.g. second branch 81b, may define a radially outer wall 86 of the second bifurcated section 75b of the coolant channel 75.

The forked rib arrangement may have the benefit of increasing the number of the ribs at the end of the channel 75, e.g. towards the leading edge 51 of the aerofoil 50, for increasing the structural strength of the aerofoil component 50, while minimising the number and size of the holes in the ceramic core and in turn a reduction in the strength of the ceramic core 70 as a result of holes therein.

As shown in FIG. 6, the radially inner side 87 of the first branch 81a and the radially outer side 88 of the second branch 81b of the first rib 81 define a space therebetween that is part of the central cavity 64 of the aerofoil component as described above with respect to FIG. 4.

Although not required, the coolant channel 75 may also comprise a pair of second ribs 82 extending between the first and second walls 61, 62. The pair of second ribs 82 are arranged with one rib 82 on each side of the first rib 81. A first one 82a of the pair of second ribs 82 is located at a position that is radially outwards of the first rib 81 and the other one 82b of the pair of second ribs 82 is located at a position that is radially inwards of the first rib 81. As shown in FIG. 6, the pair of second ribs 82 extend towards, but not entirely to, the end of the coolant channel 75 in the downstream direction, such that the respective bifurcated sections 75a, 75b are not themselves bifurcated or subdivided at the end of the channel 75. Conversely, the first rib 81, particularly the first branch 81a and the second branch 81b thereof, extends downstream of the second ribs by a longitudinal extent 89. In this way, the strength of the final component 50 can be increased by the second ribs 82a, 82b, while ensuring that the ceramic core includes sufficient material at the end of the channel 75 to maintain the strength and integrity of the core, e.g. during the casting of the final component.

The selection of the size of the longitudinal extent 89 may depend on a number of factors, such as the minimum length required to maintain integrity of the core during the casting process, as well as those relating to the process of forming the ceramic core. For example, the longitudinal extent 89 may be selected to ensure that the corresponding section of the die cavity for the ceramic injection moulding process (CIM) is large enough to receive the feedstock that is injected into the die cavity during the CIM process. In view of such factors, the longitudinal extent 89 may be at least 5 mm, preferably at least 8 mm.

The pair of second ribs 82 provide additional structural support to the coolant channel, without significantly reducing the strength of the corresponding ceramic core 70, as compared to hypothetical arrangements in which the second ribs extend to the distal end of the coolant channel in the downstream direction.

The aerofoil component depicted in FIG. 6 may be manufactured in an investment casting method using a ceramic core 70 as now described with respect to FIG. 7. Although not shown, the ceramic core 70 includes a cavity that corresponds to the desired shape of the internal wall 61 of the aerofoil component 50. The outer surface 72 of the ceramic core defines the inner surface of the outer wall 62 of the aerofoil component 50. A section 73 of the core 70 corresponds to the shape of the space 63 that defines the forward-flowing coolant channel 75 described above with respect to FIG. 6. A section 74 of the core 70 corresponds to the shape of the central cavity 64 of the aerofoil component 50. A further section 77 of the core 70 defines the shape of a rearward-flowing channel 66 of the aerofoil component 50.

As shown, section 72 of the core 70 that corresponds to the coolant channel 75 is configured to have a pronged shape in that it is divided into two sections, a first section 73a and a second section 73b, which are separated radially at a first end of the core 70, e.g. corresponding to a leading edge 51 of the aerofoil component 50, but are connected or joined at a second end opposite the first end in the longitudinal direction 78. Although not shown, the two sections of the section 72 are supported by the overall core 70 at the radially innermost and outermost regions of the first end corresponding to the end of the coolant channel 75 or leading edge 51 of the aerofoil component 50.

To define and form the shape of the first rib 81 described with respect to FIG. 6, the core 70 includes a first hole 91 or void that is elongate in the longitudinal direction 78 and extends to the distal end of the core 70 in the downstream direction. The first hole 91 extends in a transverse direction perpendicular to the longitudinal and radial directions 78, 79 between the outer surface 72 of the core 70 and a cavity 71 (not shown). Similarly to the first rib 81, the first hole 91 is radially central to the core 50 and has a total longitudinal extent 84 that is equal to the longitudinal extent 84 of the first rib 81. The first hole 91 subdivides and bifurcates the section 73 to provide the pronged shape described above. Such an arrangement may allow access to the cavity 71 (not shown in FIG. 7) defining the inner wall 61 of the aerofoil component 50 for firing media removal and/or inspection, while facilitating the formation of a rib in the component to be manufactured using the core that increases the strength of the coolant channel, once formed.

The space between the two pronged sections 73a and 73b is configured to receive the core section 74 that corresponds to the shape of the central cavity 64 of the aerofoil component 50. The radially inner side 97 of the first section 73a and the radially outer side 98 of the second section 73b of the first rib 81 co-operate with the core section 74 to define the bifurcated or "forked" shape of the first rib 81.

Although not required, the section 73 of the core 70 may include a pair of second holes 92 extending between the outer surface 72 of the core 70 to the cavity 71 (not shown), to define the pair of second ribs 82 described with respect to FIG. 6. The pair of second holes 92 are arranged with one on each side of the first hole 91. A first one 92a of the pair of second holes 92 is located at a position that is radially outwards of the first hole 91 and the other one 92b of the pair of second holes 92 is located at a position that is radially inside the first hole 91. As shown in FIG. 7, the pair of second holes 92 extend towards, but not entirely to, the end of the core section 73 in the longitudinal direction 78 corresponding to the leading edge side 51 of the aerofoil component 50. In particular, the first hole 91, particularly the first and second sections 73a, 73b extend beyond the first hole 91 in the longitudinal direction 78 (corresponding to the downstream direction) by a longitudinal extent 89 that is equal to the longitudinal extent described above with respect to FIG. 6.

With reference to FIGS. 6 and 7, it will be appreciated that by providing appropriate numbers of ribs 81, 82 (and corresponding holes 91, 92) the separation between adjacent ribs 81, 82 within each group of ribs 81, 82 may be controlled, for example to meet design criteria such as those discussed below.

The separation between adjacent ribs 81, 82 (and holes 91, 92) corresponds to a section of the ceramic core. In an arrangement, the radial extent separating two adjacent ribs 81, 82 may be at least 6 mm$^2$, optionally at least 8 mm$^2$. This corresponds to ensuring that the minimum radial extent of a section of the ceramic core (used in the manufacture of the component) between adjacent holes is greater than 6 mm$^2$ and optionally greater than at least 8 mm$^2$. This may ensure that such a section of the ceramic core has at least a minimum strength and may reduce the likelihood of breakage and/or deflection of a section of the core during the formation of the component 50 around the core 70.

In an arrangement, the ribs 81, 82 (and holes 91, 92) may be configured such that the minimum radial extent of each ribs 81, 82 is at least 5 mm, optionally at least 10 mm, optionally at least 15 mm. This may provide sufficient access to the cavity 71 within the core to provide access for removal of firing media and inspection of the cavity 71 and may assist in ensuring that the mechanical strength of the component 50 is sufficient.

Although the disclosure above has related to the provision of a single pair of second ribs 82 (and corresponding holes 92), in general a component may have any number of second ribs arranged within the coolant channel 75.

In an arrangement, the first rib that extends to the end of the coolant channel 75 within the component 50 (and its corresponding hole in the ceramic core) may be configured to have a longitudinal extent (or length in the elongate direction of the rib) that is at least 20 mm. Such an arrangement may increase the strength of the aerofoil component 50.

In the case of providing flows of coolant within an aerofoil blade or vane, the present disclosure has been described with respect to a so-called reverse-pass system in which in at least some passages within an aerofoil 50, the coolant generally flows in a forward-flowing direction from the trailing edge 52 to the leading edge 51 of the aerofoil 50. However, the present disclosure is more widely applicable to a variety of arrangements of coolant flow, including arrangements in which the coolant generally flows from the leading edge 51 to the trailing edge 52 of the aerofoil 50. The arrangements of ribs 81, 82 discussed herein may be used in either such coolant arrangement. Accordingly, in an arrangement, in the region of the first rib 81, the coolant flow direction may be in a direction from the aerofoil trailing edge 52 to the aerofoil leading edge 51. In an arrangement, in the region of the first rib 81, the coolant flow direction 76 may be in a direction from the aerofoil leading edge 51 to the aerofoil trailing edge 51.

While the first rib 81 has been described above as being bifurcated in the downstream direction to form two radially separated sections 81a, 81b, this is not essential. In other arrangements, the first rib 81 is not bifurcated, and may instead have substantially the same profile along the entire longitudinal extent 84 of the first rib 81. For example, the first rib 81 may be radially central (to the aerofoil component 50) and have the same radial extent along its total longitudinal extent 84.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A component for a gas turbine engine, comprising:
   first and second walls;
   a coolant channel defined by the space between the first and second walls; and
   a first rib extending between the first and second walls to the end of the coolant channel in a coolant flow direction, such that the coolant channel is bifurcated in the coolant flow direction,
   wherein the component is an aerofoil blade or vane comprising an aerofoil leading edge, an aerofoil trailing edge and an aerofoil suction side opposite an aerofoil pressure side, wherein the first wall is provided on the aerofoil suction side, the second wall is adjacent to the first wall, and the first wall and the second wall define the coolant channel to cool the aerofoil suction side of the component, and
   wherein the first rib is itself bifurcated into two radially separated sections that both extend to the end of the coolant channel in the coolant flow direction.

2. The component as claimed in claim 1, wherein the coolant channel is bifurcated into two sections that are separated in a radial direction of the component by the first rib.

3. The component as claimed in claim 1, wherein the first rib is radially central to the component.

4. The component as claimed in claim 1, wherein the first rib has a total longitudinal extent that is at least half of a maximum longitudinal extent of the coolant channel.

5. The component as claimed in claim 1, further comprising a pair of second ribs extending between the first and second walls, wherein a first one of the pair of second ribs is located at a position that is radially outwards of the first rib and a second one of the pair of second ribs is located at a position that is radially inwards of the first rib.

6. The component as claimed in claim 5, wherein the pair of second ribs extend towards, but not entirely to, the end of the coolant channel in the coolant flow direction.

7. The component as claimed in claim 1, wherein a radial extent of the coolant channel increases in the coolant flow direction.

8. The component as claimed in claim 1, wherein the coolant channel is a forward-flowing passage in that the coolant flow direction is from the aerofoil trailing edge to the aerofoil leading edge.

9. A gas turbine engine for an aircraft comprising:
   an engine core comprising a turbine, a compressor, and a core shaft connecting the turbine to the compressor;
   a fan located upstream of the engine core, the fan comprising a plurality of fan blades;
   a gearbox that receives an input from the core shaft and outputs drive to the fan so as to drive the fan at a lower rotational speed than the core shaft; and
   at least one component as claimed in claim 1.

10. The gas turbine engine as claimed in claim 9, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, second compressor, and second core shaft are arranged to rotate at a higher rotational speed than the first core shaft.

* * * * *